United States Patent

[11] 3,578,866

[72] Inventors Bryan E. Kohler
  Cambridge, Mass.;
  Alan S. Dubin, Hockessin, Del.
[21] Appl. No. 823,361
[22] Filed May 9, 1969
[45] Patented May 18, 1971
[73] Assignee California Institute of Technology
  Pasadena, Calif.

[54] FREQUENCY MODULATED OPTICAL SPECTROMETER
  11 Claims, 2 Drawing Figs.
[52] U.S. Cl. .................................................. 356/74,
  250/226, 356/97, 356/98
[51] Int. Cl. ........................................................ G01j 3/00,
  G01j 3/42
[50] Field of Search ........................................... 250/226;
  356/74; 350/101

[56] References Cited
UNITED STATES PATENTS
3,041,459  6/1962  Greene, Jr. .................. 250/226

OTHER REFERENCES

" Principles of Self-Modulating Derivative Optical Spectroscopy " ; Bonfiglioli & Brovetto; APPLIED OPTICS; Vol 3 #12; Dec. 1964; pg. 1417 – 1424

*Primary Examiner* — Ronald L. Wibert
*Assistant Examiner* — Vincent P. McGraw
*Attorneys* — Samuel Lindenberg and Arthur Freilich

ABSTRACT: An optical spectrometer is adapted to provide differential wavelength modulation of a spectral signal by vibrating a photosensitive cell in the focal plane of the spectrograph. A synchronous detector is employed to demodulate the output signal of the photosensitive cell, and thereby provide to a recording device a signal that is the derivative of the spectral signal.

PATENTED MAY 18 1971 3,578,866

BRYAN E. KOHLER
ALAN S. DUBIN
INVENTORS

BY Lindenberg Freilich

ATTORNEYS

FREQUENCY MODULATED OPTICAL SPECTROMETER

BACKGROUND OF THE INVENTION

This invention relates to analytical spectrometers, and in particular to an improved method and apparatus for modulating the spectral signal thereof.

In the past, it has been recognized that spectrum analysis requires very high stability of radiation source, radiation sensitive cell and amplifier. Various techniques have been devised to improve performance of spectrometers, such as the addition of a chopper in the radiation beam path. However, a chopper is generally useful only in eliminating drifts in the amplifier, and in rejecting noise developed in the sensitive cell and the amplifier. Any improved signal-to-noise ratio achieved is at the expense of radiant power received by the cell since the beam is chopped off half the time.

Another more recent technique described by I. Balslev in Physical Review, Vol. 143 (1966), at pages 640 and 641 consists of vibrating the exit slit of the spectrometer at a reference frequency in order to measure the derivative of absorption with respect to wavelength, and synchronously detecting the modulated signal at the reference frequency. This allows the direct detection of small changes in absorption while studying small spectral details masked by continuous absorption, or while looking for extremely weak absorptions. The advantage over a chopper is that there is no signal at the reference frequency unless there is an absorbing substance present in the beam path to produce a nonlinear response in the cell. In that manner, the signal-to-noise ratio of the spectrometer is improved.

Another technique after that by I. Balslev reported by A. Gilgore, et al., in Review of Scientific Instruments Vol. 38 (1967) at pages 1535 and 1536, employs a rotating quartz plate to cyclically deflect the spectrum by inclining the plate at an angle $\Theta$ to the axis of rotation. Thus, the derivative of absorption with respect to wavelength is measured by vibrating the spectrum on the exit slit instead of vibrating the slit.

SUMMARY OF THE INVENTION

In accordance with the present invention, a spectrometer is adapted to produce frequency modulation of the spectral signal by vibrating a sensitive cell in the focal plane thereof. A reference signal provided to vibrate the cell is employed to synchronize a detector. In that manner, the derivative of the spectral signal is provided for recording. The amplitude of vibration may be readily adjusted for optimum instrument performance.

Although features of the invention to be protected are set forth with particularity in the appended claims, the invention will best be understood from the following description of the illustrative embodiment with reference to the accompanying drawings.

DESCRIPTION OF THE PREFERRED EMBODIMENTS

Figure 1:
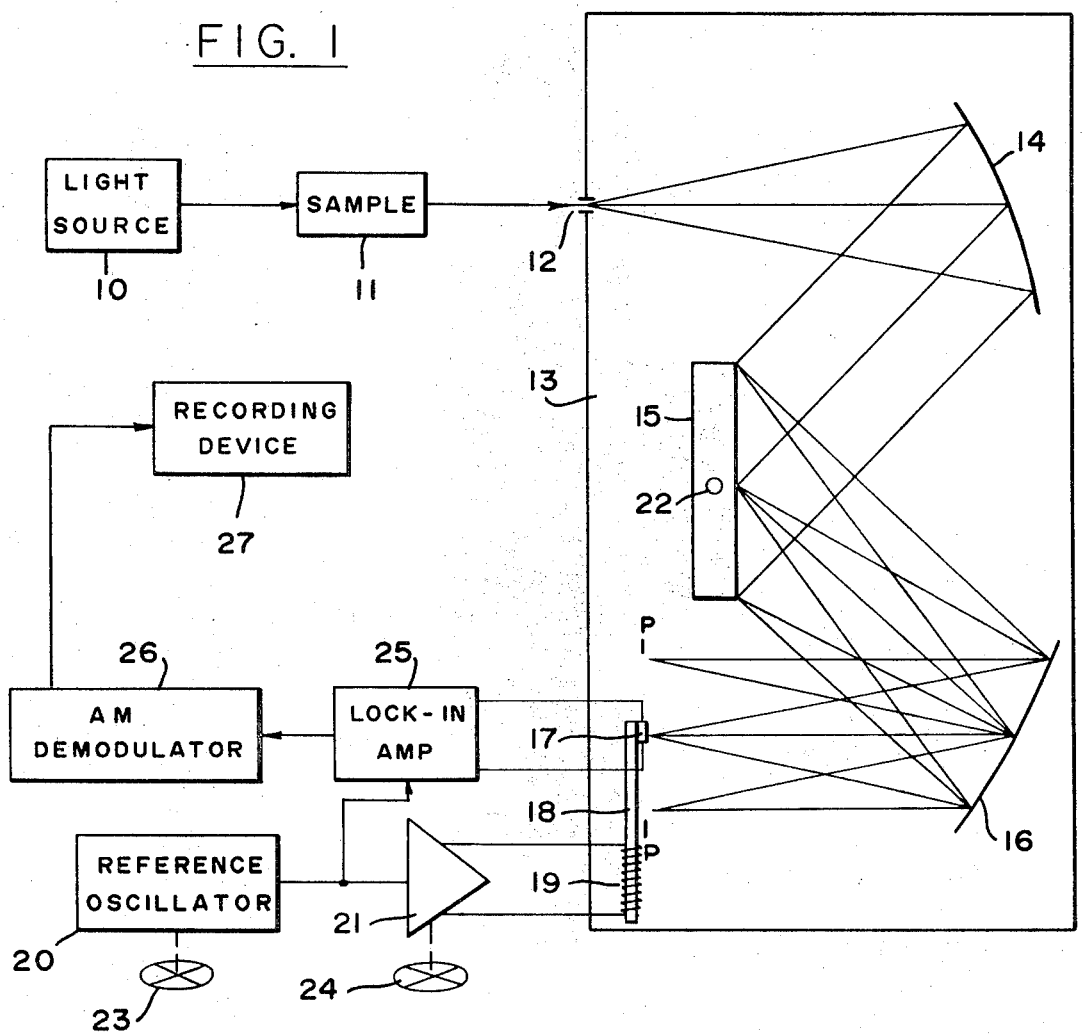
FIG. 1 illustrates schematically a preferred embodiment in a single beam absorption spectrometer.

Referring to the drawing, a preferred embodiment of the present invention is illustrated in a single-beam absorption spectrometer. However, it should be understood that the present invention may be employed to equal advantage in a double-beam absorption spectrometer and in other types of spectrometers, particularly but not limited to transition (radiation and emission) spectrometers.

A light source 10 is provided to direct a beam of light through a sample 11 into a slit 12 of a spectrograph 13 having a first mirror 14 for directing light into a diffraction grating 15 which directs diffracted light into a second mirror 16. The second mirror 16 reflects the diffracted light onto a focal plane P-P where in lieu of a photographic plate, a photosensitive cell 17 is connected to an armature 18 of an electromechanical transducer 19 for vibration in the focal plane in response to an alternating signal applied thereto. The alternating signal is generated by a reference oscillator 20 and amplified by a suitable amplifier 21, such as an audio amplifier.

To clarify the exact role of the present invention, consider first the operation of a conventional spectrometer having a stationary slit which is not unlike the present one if the cell is held stationary.

The light within the spectrograph 13 is dispersed by the diffraction grating 15 into its component wavelengths such that with the cell 17 stationary, light that impinges on it at any given time is nearly monochromatic i.e., the exciting light falling on the cell 17 is of a single wavelength. Upon rotating the grating 15 about an axis 22 (by conventional means not shown) the wavelength of the light that impinges on the stationary cell 17 is continually varied.

Due to the absorption characteristics of the sample 10, the intensity of the exciting light impinging on the cell 17 at any given time produces an electrical signal of proportional amplitude. This signal can be recorded on a standard device, such as an oscillograph or oscilloscope. If the grating rotates at a uniform rate, the change in the wavelength of the exciting light with time is likewise uniform, and the recorder plots a continuous wave curve describing the intensity of the exciting light as a function of its wavelength as illustrated by graph A of FIG. 2.

Often absorption spectroscopy involves measuring weak absorptions by detecting small changes in the intensity of the monochromatic components of the irradiating light. Since the system which includes a detector and amplifier are apt to produce fluxuations with time (commonly referred to as instrument noise), the task of measuring weak absorptions is made more difficult, and sometimes impossible, however small these fluxuations may be since they are dutifully recorded, thereby making low amplitude peaks of the spectral curve produced by weak absorptions. Therefore, if the absorption peaks in the spectrogram are only as large in magnitude as the fluxuations characteristic of noise, the method of detecting absorption by simply rotating the diffraction grating 15 is not adequate. In other words, providing a stationary photosensitive cell 17 in the focal plane of the spectrograph 13 in lieu of a slit is scarcely more effective than providing a slit of the same dimensions with the photosensitive cell 17 outside the spectrograph 13.

To improve the sensitivity of the system, the cell 17 is vibrated (moved back and forth) in the focal plane P-P of the spectrograph with harmonic motion. The frequency of vibration is determined by the reference oscillator 20 which is a conventional variable oscillator designed to produce a stable frequency set by a dial 23. The amplitude of vibration is then adjusted through the amplifier 21 by setting of a dial 24. Using a conventional audio amplifier and electromechanical transducer, the amplitude of vibration may be set by simply adjusting the "volume" control of the amplifier.

The modulated signal generated by the vibrating photosensitive cell 17 is amplified by a conventional lockin amplifier 25 and demodulated by a conventional demodulator 26 to transmit to a recording device 27 a signal which is the derivative of absorption with respect to wavelength. To accomplish that, the reference frequency employed to vibrate the cell 17 in the focal plane of the spectrograph 13 is applied to the lockin amplifier 25. Alternatively, the lockin amplifier 25 may be a conventional amplifier tuned to the frequency of the reference oscillator 20.

Figure 2:
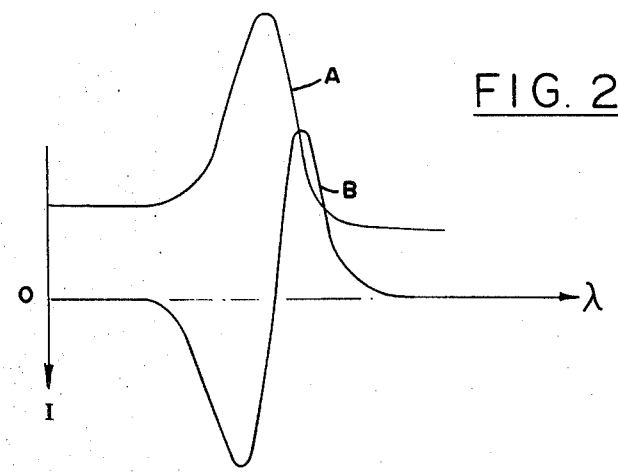
FIG. 2 illustrates in a simplified spectrogram, absorption and the derivative of absorption for a hypothetical absorbing substance present in the beam path of the spectrometer of FIG. 1.

To assist in understanding how the derivative of absorption with respect to wavelength is derived by vibrating the cell 17, consider the typical spectral signal recorded in graph A of FIG. 2. That spectral signal is derived by a conventional signal-beam spectrometer with a stationary slit in the position of cell 17 as the diffraction grating 15 is rotated to sweep the component wavelengths before the slit. It should be noted that the same spectral signal would be derived if the photosensitive cell 17 were moved across the focal plane without vibration, thereby measuring the intensity of light as it is moved through the points of convergence of the component wavelengths in the focal plane. It should also be noted that the time required to sweep or scan through all component wavelengths is generally in the order of minutes.

If the photosensitive cell 17 is vibrated with an amplitude equal to approximately one-half the width of the natural spectral lines on the focal plane P–P, the spectral signal is modulated. Upon synchronous demodulation, the derivative of the spectral signal (graph A) is produced as shown by the graph B. Each "peak" of the spectral signal is thus represented by a differentiated wave with zero-crossover at the center of the "peak." In other words, given the frequency of vibration $\omega t$, the cell 17 sees light of wavelength $\lambda_o + \Delta\lambda \cos \omega t$. But the amplitude of the resulting alternating signal remains zero unless the intensity of the light varies along the very short distance of vibration as the total spectrum is scanned. The greater the change in intensity for a given $\Delta\lambda$ the greater the amplitude of the modulated signal. The result is an AC carrier signal at the frequency $\omega t$ that is amplitude modulated by the derivative of the spectral signal. Noise rejection then becomes possible by amplifying the amplitude modulated signal at the frequency $\omega t$ using standard electronic techniques for discriminating against any signals of frequencies other than $\omega t$. An output signal for the recording device 27 is then derived by standard amplitude demodulation techniques.

The vibration amplitude for the cell 17 is adjusted for optimum instrument performance. For sharp high intensity spectral lines, the amplitude of vibration may be adjusted to substantially less than half the line width, a line width being a peak centered about a given wavelength by which the spectral line is identified. For low intensity spectral lines (peaks) not well defined, the amplitude may be increased to approximately half the spectral width. The frequency of vibration may also be adjusted for optimum results. In general, the higher spectral lines require lower frequencies since the amplitude modulation being achieved is a function of the rate of change of light intensity. Proper adjustment of the spectrometer will therefore frequently require an adjustment in both amplitude and frequency. In that regard, it should be noted that while the vibrating frequency is in the order of kilohertz, the time required to scan one spectrum is in the order of minutes.

The greatly improved signal-to-noise ratio provided by the present invention is due to various contributing factors which are for the first time brought together to optimize the technique described by I. Balslev of measuring the derivative of absorption with respect to wavelength. A significant factor is that, by substituting the photosensitive cell 17 for the exit slit, substantially all of the photosensitive cell surface receives light at all times, thereby virtually eliminating "dark current" from the cell. For instance, if less than 10 percent of the photosensitive surface of the cell receives a light beam at any given time, the "dark current" from the other 90 percent may mask the current produced by the light beam if the light beam is weak. Another advantage is that the height of the cell may be readily reduced, while maintaining the width as before, to improve resolution at no loss in the signal-to-noise ratio.

To further optimize the signal-to-noise ratio, and thereby maximize sensitivity (resolution) of the instrument, it is desirable to be able to vary the amplitude and frequency of vibration. This is greatly facilitated by substituting the photosensitive cell 17 for the exit slit and vibrating the cell. Since less mass is involved than in a vibrating slit arrangement, the range of vibrating frequencies is greatly increased. Moreover, less power is required to vibrate the cell and there is less of a problem of isolating the rest of the system from the vibration, such as the rotating diffraction grating.

Still another advantage is elimination of the need for an exit slit by combining the functions of modulating and sensing the spectral signal. The photosensitive cell 17 substituted for the exit slit may be produced to the dimensions desired (about 5 to 500 microns in width and up to 1 cm in height) by employing standard techniques which have been developed in the field of semiconductive devices. For IR spectroscopy, a suitable IR sensitive cell or bolometer may be readily produced by the same techniques. In each case, the mass of a photosensitive cell produced in that manner would not add significantly to the mass of the electromechanical transducer employed to vibrate it. For instance, if the driver of a loud speaker having a flat frequency response for the range of vibrating frequencies desired is selected for the transducer, connecting the photosensitive cell 17 thereto would not significantly alter its frequency response characteristics. For higher frequencies of vibration, a piezoelectric crystal driver would be preferred.

The rotating disc arrangement of the prior art referred to hereinbefore is also not as simple and inexpensive as substituting the photosensitive cell for the slit and vibrating the cell. First there is the problem of finding transparent material that is refractive for the disc. Then there is the problem of providing an adjustment in the amplitude and frequency of modulation. It can not be done electronically; amplitude changes require a change in the angle between the axis of the disc and the axis of the rotating shaft on which it is mounted. Moreover, very high frequencies are not possible as with a vibrating cell.

Other advantages of the present invention over the rotating disc arrangement are that the present invention will readily work in vacuum ultraviolet spectroscopy and can be used with a polarized light source. A rotating disc would produce spurious signals in response to polarized light.

While in the foregoing, a single embodiment has been described in some detail, other embodiments will readily occur to those skilled in the art without departing from the spirit of the invention. It is therefore intended that the present invention be limited in scope only by the terms of the following claims.

We claim:

1. In a spectrometer having means for splitting radiant energy according to frequency and for focusing all parts of a large frequency range in a given focal plane to form a spectrum within an opaque enclosure, the improvement comprising a source of a stable alternating signal and means responsive to said signal for vibrating a spectral beam sensitive cell at a fixed station within said enclosure in said focal plane while said spectrum is being scanned past said fixed station in said plane to produce as an output signal of said cell an alternating signal at the frequency of vibration of said cell, said output signal having at any given time an amplitude proportional to the change of intensity of radiation being sensed by said cell as said cell is vibrated through one complete cycle.

2. The improvement of claim 1 including means for adjusting the amplitude of said alternating signal to adjust the amplitude of vibration of said cell.

3. The improvement of claim 2 including means for adjusting the frequency of said alternating signal to adjust the frequency of vibration of said cell.

4. In a spectrometer, the improvement comprising:
an opaque enclosure having a slit for receiving radiant energy;
means within said enclosure for dispersing and focusing all parts of a range of frequencies of said energy in a given focal plane to form a spectrum;
a cell within said enclosure, said cell being sensitive to said energy at all frequencies within said range of frequencies;
means for vibrating at a stable frequency said sensitive cell at a fixed station in said focal plane while said spectrum is being scanned past said fixed station in said plane, thereby producing an alternating signal at said frequency, the amplitude of said signal at any given time being proportional to the change in intensity of radiation energy being sensed during one cycle of vibration; and
means for demodulating said amplitude modulated signal.

5. In a spectrometer the combination comprising:

an opaque enclosure having only an entry slit for receiving radiant energy from a source, and no exit slit;

means within said enclosure for dispersing a radiant beam from said source into spectral beams of a given spectrum;

a cell sensitive to all spectral beams of said spectrum for producing a signal in proportion to the intensity of radiation being received at any given time;

means for scanning said spectral beams within said enclosure in a given direction with said cell; and means for vibrating said cell at a stable frequency, and in a direction parallel to said given direction of scanning said spectral beams, to modulate said signal produced by said cell into an alternating signal at said frequency of vibration with an amplitude of any given cycle proportional to the change of intensity of radiation being received by said cell as said cell is vibrated through one cycle.

6. The combination of claim 5 including means for adjusting the amplitude of vibration of said cell.

7. The combination of claim 6 including means for adjusting the frequency of vibration of said cell.

8. The combination of claim 7 wherein said means for vibrating said cell is responsive to an alternating signal, said means for adjusting amplitude of vibration comprises means for adjusting the amplitude of said alternating signal, and said means for adjusting frequency of vibration comprises means for adjusting the frequency of said alternating signal.

9. In an instrument for spectroscopy of the type normally having an opaque enclosure housing a dispersing system, said enclosure having an exit slit through which components of a spectrum are caused to pass in sequence for detection by a sensitive cell while scanning said spectrum in a given direction, the improvement comprising:

means for mounting said cell within said enclosure at a station normally occupied by said exit slit; and means for vibrating said cell in place at a stable frequency in a direction parallel to said given direction of scanning said spectrum.

10. The improvement of claim 9 including means for adjusting the amplitude of vibration of said cell.

11. The improvement of claim 10 including means for adjusting the frequency of vibration of said cell.